Jan. 24, 1928.
D. M. HUGHES
1,657,399
INTERNAL COMBUSTION ENGINE
Filed Sept. 15, 1925  2 Sheets-Sheet 1
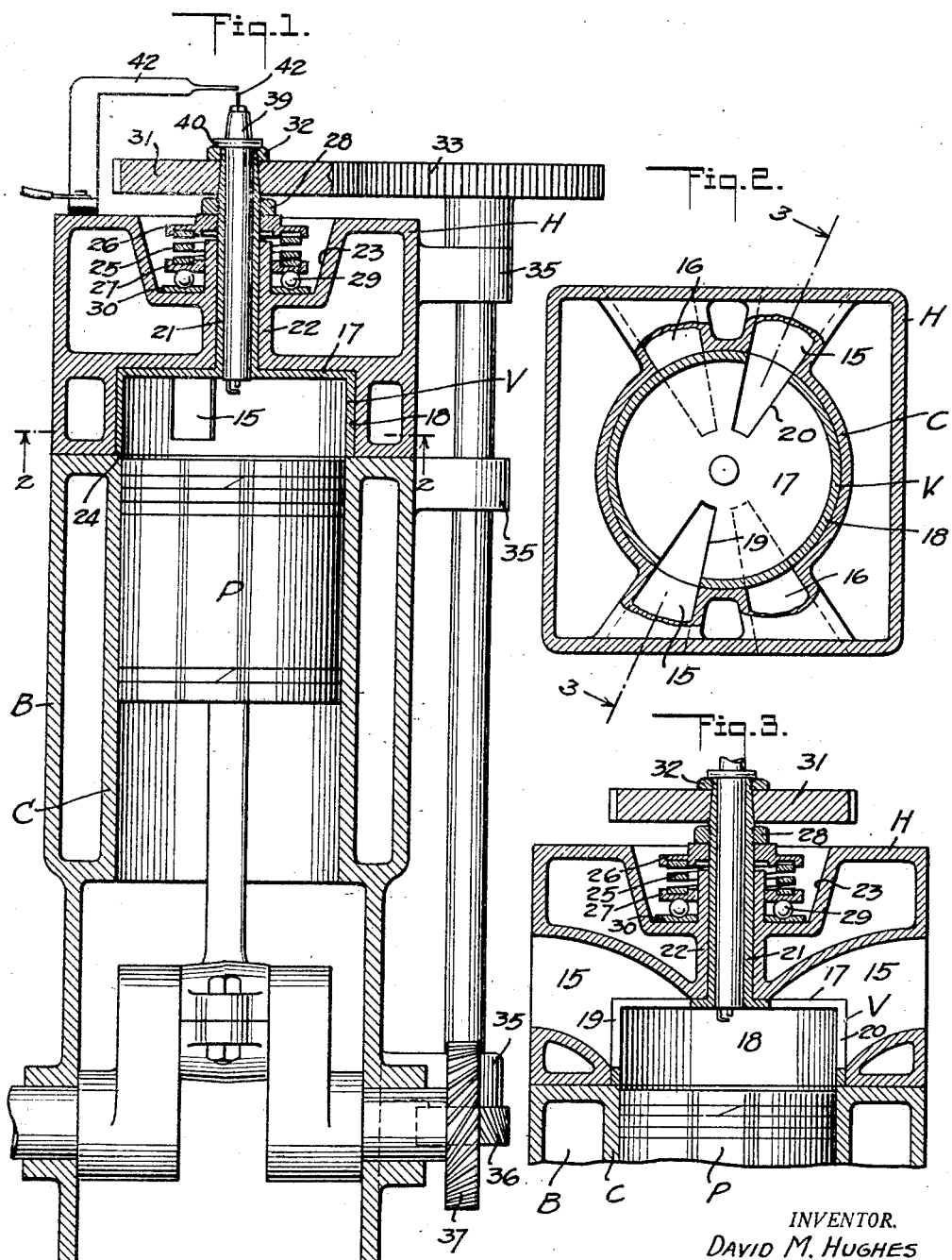
INVENTOR.
DAVID M. HUGHES
BY Munn & Co.
ATTORNEYS.

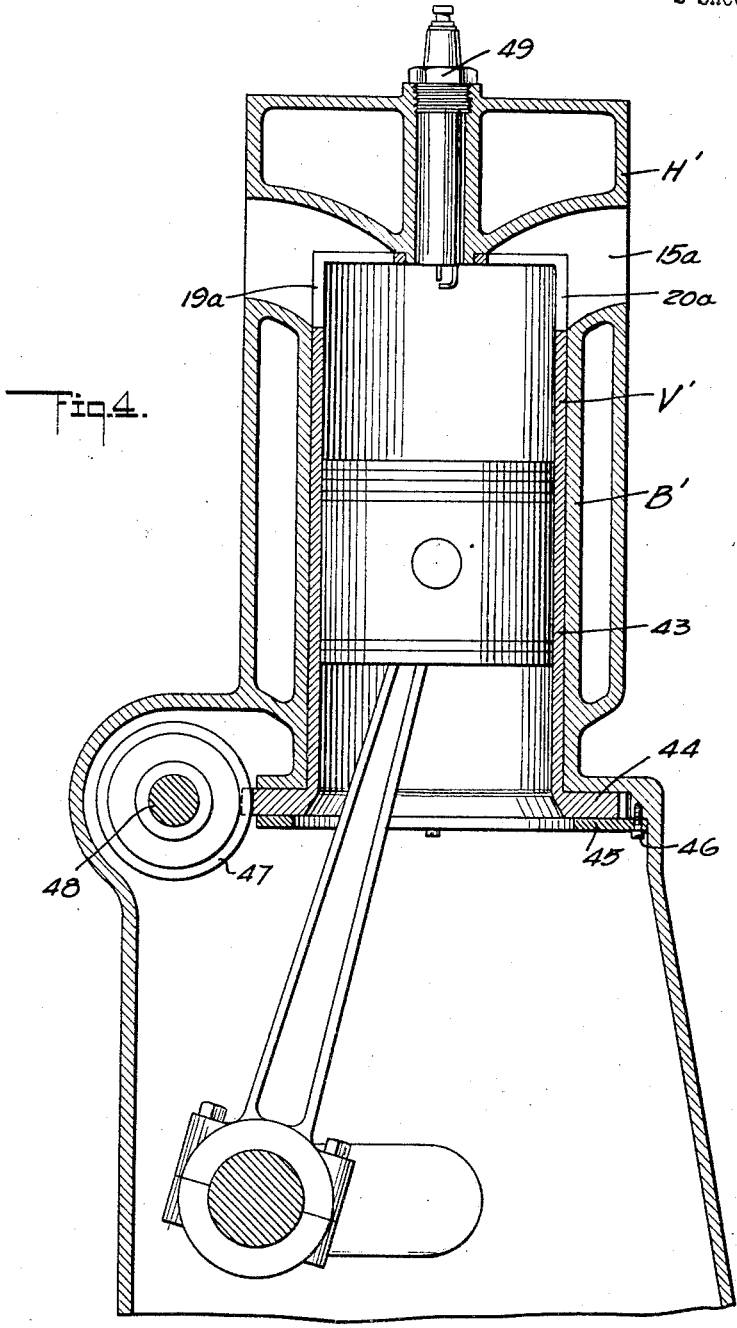

Patented Jan. 24, 1928.

1,657,399

UNITED STATES PATENT OFFICE.

DAVID M. HUGHES, OF LOS ANGELES, CALIFORNIA.

INTERNAL-COMBUSTION ENGINE.

Application filed September 15, 1925. Serial No. 56,539.

My invention relates to internal combustion engines and the purpose of my invention is the provision of an internal combustion engine in which the intake and exhaust ports and the valve for controlling such ports are all embodied in the cylinder head, whereby a direct intake and exhaust to and from the compression end of the cylinder is rendered possible, and upon removal of the cylinder head direct access is had to the compression chamber, valve, and intake and exhaust ports.

It is also a purpose of my invention to provide an internal combustion engine of the above described character wherein a single valve of the rotary type is provided for controlling both the intake and exhaust ports, the construction of the valve being such that relatively large intake and exhaust ports can be employed to effect an intake of fuel in relatively large volumes, and a complete scavenging of the cylinder of burnt gases and other products of combustion.

A further purpose of my invention is the provision of a rotary valve with means for maintaining a fuel-tight joint between the valve and the cylinder head, and the association of a spark plug therewith to permit the ignition of the fuel directly within the valve.

I will describe only two forms of internal combustion engine embodying my invention, and will then point out the novel features thereof in claims.

In the accompanying drawings,

Figure 1 is a view showing in vertical section one form of internal combustion engine embodying my invention;

Figure 2 is a horizontal sectional view taken on line 2—2 of Figure 1;

Figure 3 is a vertical sectional view taken on line 3—3 of Figure 2;

Figure 4 is a vertical sectional view of another form of internal combusiton engine embodying my invention.

Referring specifically to the drawings, in which similar reference characters refer to similar parts in each of the views, my invention in the embodiment shown in Figures 1 to 3 comprises a cylinder block B having a cylinder C in which works the piston P. Suitably secured upon the block B is a cylinder head H, which, as clearly shown in Figures 2 and 3, is constructed to provide intake and exhaust ports 15 and 16 respectively arranged in pairs and extending inwardly and downwardly from opposite sides of the head along lines intersecting the longitudinal axis of the cylinder C. It will, of course be understood that suitable manifolds (not shown) are provided for supplying gaseous fuel to the intake ports 15, and for receiving the exhaust gases as expelled from the cylinder.

The ports 15 and 16 are controlled by a rotary valve V comprising an inverted cup-shaped body having a disk portion 17 and an annular portion 18 extending downwardly from the periphery of the disk portion. The body of the valve V is formed with two ports 19 and 20 disposed at diametrically opposed points and extending radially of the disk portion and downwardly of the annular portion, thus providing relatively large ports of maximum capacity to correspond to the relatively large intake and exhaust ports. Centrally of the disk portion 17 the valve is provided with a tubular stem 21 journaled in a bearing 22 constituting a part of the cylinder head H and projecting into a cupped chamber 23, the latter constituting a part of the cylinder head H.

As clearly shown in Figures 1 and 2, the construction of the cylinder head H is such as to expose a portion of the upper end of the cylinder block B and the valve V and to thus provide an annular shoulder 24 upon which the lower edge of the annular portion 18 may be supported. The valve V as a unit, however, is urged upwardly to provide a fuel-tight joint between the disk portion 17 and the cylinder head H. To this end a coiled expansible spring 25 is interposed between a pair of grooved rings 26 and 27, the upper of which is confined against upward movement by means of a nut 28 threaded on the stem 21, while the lower ring is rotatably supported on ball bearings 29, the latter in turn rotating on a raceway plate 30 supported on the bottom wall of the chamber 23. In such an arrangement the spring 25 urges the ring 26 upwardly, and through the medium of the nut 28, such urging action is transmitted to the stem and consequently the valve.

As shown in Figure 3, the upper end of the stem 21 is tapered and extended into the tapered opening of a gear 31, with the latter secured against displacement from the stem by means of a nut 32. A second gear 33 constantly meshes with the gear 31 to drive the latter and hence the valve V, the gear 33 being fixed to the upper end of a shaft 34 journaled in bearings 35 and provided at its lower end with a spiral gear 36 meshing with a similar gear 37 fixed to and operable by the crank shaft 38 of the engine.

The tubular stem 21 receives a spark plug 39 in such manner that the plug rotates with the stem. The lower end of the plug is disposed within the body of the valve V, while its upper end projects above the gear 31 where it is formed with an annular flange 40 to limit the downward movement of the plug within the stem. Current is adapted to be supplied to the plug 39 through a conducting arm 41 secured to but insulated from the cylinder head H and having its free end in spaced relation to the upper end of the conductor 42 of the spark plug.

In operation, the valve V is continuously rotated in the same direction to cause its ports 19 and 20 to successively register with the ports of the intake and exhaust ports 15 and 16 and in a manner to successively admit gaseous fuel to the cylinder and then to permit the exhaust of burnt gases therefrom, it being understood that the spark plug 39 operates to ignite the gaseous fuel as each charge is admitted to the cylinder.

From the foregoing operation, it will be manifest that I provide an internal combustion engine in which gaseous fuel is admitted directly to the combustion end of the cylinder, and through the provision of the relatively large ports, a maximum charge of fuel can be instantaneously admitted which operates to increase the power as well as the efficiency of the engine. Further, the ports permit the complete scavenging of the cylinder of burnt gases, and rapidly, through the intimate association of the exhaust ports with the compression end of the cylinder. It is to be particularly noted that the valve V is rotatable about an axis coinciding with the longitudinal axis of the cylinder.

Referring now to Figure 4, I have herein shown another form of engine embodying my invention, in which the cylinder head H' is cast integral with the cylinder block B'. The cylinder head H' is provided with intake and exhaust ports 15$^a$ and 16$^a$ arranged in the same manner as the ports 15 and 16 in the first form of my invention. These ports are controlled by a rotary valve V' having two ports 19$^a$ and 20$^a$ which successively register with the intake and exhaust ports in the same manner as the first form of valve. The valve V', however, is formed with an attenuated sleeve 43 rotatable in the cylinder and co-extensive in length therewith, its lower end being formed with a gear 44 rotatable between the engine block and a plate 45 of annular form secured to the block by screws 46. The gear 44 constantly meshes with a gear 47 fixed to a shaft 48, all disposed within the crank shaft housing and operatively connected to the crank shaft in any suitable manner.

In this embodiment of my invention, the valve V' is continuously rotated to control the intake and exhaust ports with the piston P operating within the sleeve 43, and the gaseous fuel being ignited by a spark plug 49 in the cylinder head H'.

Although I have herein shown and described only two forms of internal combustion engine embodying my invention, it is to be understood that various changes and modifications may be made herein without departing from the spirit of the invention and the scope and spirit of the appended claim.

What I claim is:

In an internal combustion engine, a cylinder, a piston in the cylinder, a head on the cylinder having a cylindrical cavity, the diameter of which is slightly in excess of the bore of the cylinder, the cavity being closed at its top by a flat wall and open at its bottom for direct communication with the cylinder, said head having intake and exhaust ports communicating with the cavity along its side and top walls, an inverted cup shaped valve rotatable in the cavity and having a disk portion and an annular portion extending downwardly from the periphery of the disk portion, said valve having a pair of ports at diametrically opposed points extending radially through the disk portion from a point adjacent the axis of the valve and transversely through the annular portion to a point spaced from its free edge to thus provide relatively large ports of maximum capacity which, during rotation of the valve register with the intake and exhaust ports of the head, said valve having an upwardly projecting axial and tubular stem journaled in the head and in which a spark plug is adapted to be secured, said head having a cupped chamber through which the stem of the valve extends, a pair of rings in surrounding relation to the stem, an expansible coil spring interposed between the rings, a nut threaded on the stem and confining the upper ring against upward movement so that the spring will act to urge the valve upwardly into fluid tight engagement with the top wall of said cavity, and a thrust bearing interposed between the lower ring and head.

DAVID M. HUGHES.